United States Patent [19]

Hinkley

[11] Patent Number: 4,577,298
[45] Date of Patent: Mar. 18, 1986

[54] METHOD FOR CORRECTING SURFACE CONSISTENT STATICS IN SEISMIC TRACES

[75] Inventor: David Hinkley, Dallas, Tex.

[73] Assignee: Mobil Oil Corporation, New York, N.Y.

[21] Appl. No.: 530,321

[22] Filed: Sep. 8, 1983

[51] Int. Cl.$^4$ .............................................. G01V 1/00
[52] U.S. Cl. ......................................... 367/50; 367/38
[58] Field of Search ..................... 367/36, 43, 46, 50, 367/51, 37, 38, 40, 52, 54; 364/421

[56] References Cited

U.S. PATENT DOCUMENTS

| | | | |
|---|---|---|---|
| 3,539,982 | 11/1970 | Hileman et al. | 367/50 |
| 3,550,074 | 12/1970 | Kerns et al. | 367/50 X |
| 3,940,734 | 2/1976 | Blum | 367/50 X |
| 4,122,431 | 10/1978 | Perraldi | 367/51 |
| 4,210,968 | 7/1980 | Lindseth | 367/46 |
| 4,242,740 | 12/1980 | Ruehle | 367/36 |
| 4,259,733 | 3/1981 | Taner et al. | 367/50 X |
| 4,330,872 | 5/1982 | Bratton | 367/43 |
| 4,437,176 | 3/1984 | Mack | 367/38 |
| 4,498,157 | 2/1985 | Martin et al. | 367/50 |

OTHER PUBLICATIONS

"Automated Statics Corrections", by Hileman, et al., Geophysical Prospecting, vol. XVI, pp. 326–358 (presented 6/68).

"Estimation and Correction of Near-Surface Time Anomalies", by Taner, et al., Geophysics, vol. 39, No. 4 (Aug. 19, 1974), pp. 441–463.

"Residual Statics Analysis as a General Linear Inverse Problem", by Wiggins et al., Geophysics, vol. 41, No. 5 (Oct. 1976), pp. 922–938.

Primary Examiner—Charles T. Jordan
Assistant Examiner—Brian S. Steinberger
Attorney, Agent, or Firm—A. J. McKillop; Michael G. Gilman; George W. Hager, Jr.

[57] ABSTRACT

Disclosed is a method for estimating and correcting source and receiver statics contained in recorded and gathered seismic traces. Measurements based on the time of arrival of reflection and refraction signal components in the recorded and gathered traces are used to produce source-receiver statics estimates, which are in turn used to correctly time shift the individual traces of the gather for subsequent common depth point (CDP) gathering and stacking.

2 Claims, 7 Drawing Figures

METHOD FOR CORRECTING SURFACE CONSISTENT STATICS IN SEISMIC TRACES

BACKGROUND OF THE INVENTION

1. Field of the Invention

The present invention relates to a method for estimating and correcting surface consistent statics in seismic acoustic wave reflection traces and, more particularly, to a method for estimating and correcting surface consistent statics in such traces by using measurements of reflection and refraction signal component arrivals contained in the traces.

2. Discussion of the Prior Art

The determination of source-receiver statics for a group of seismic traces is well known in the art. Source-receiver statics determinations and corrections are particularly widely used when common depth point (CDP) seismic traces are gathered and stacked, e.g., summed, to improve the signal-to-noise ratio of the reflection traces. To obtain the benefits commonly associated with CDP stacking, it is imperative that primary reflection energy components in the various traces of the gather be properly aligned in time before stacking.

Typically, the seismic traces are time shifted, before stacking to account for offsets in the source-receiver pair spacing used to generate the traces. This is commonly referred to as normal moveout (NMO) correction. In addition, elevation statics may be determined and applied to correct the traces to simulate the sources and receivers used to generate the traces being on a flat surface. Thereafter, source-receiving statics are typically estimated and used to further time shift the traces so that they are properly aligned in time for the CDP stacking operation.

FIG. 1 illustrates the differences in source-to-datum travel time $S_1 \ldots S_n$ and receiver-to-datum travel time $R_1 \ldots R_n$ for a common depth point gather of traces, which are typically corrected for elevation statics, normal moveout (NMO), and source-receiver statics prior to stacking. This is typically done by first correcting for elevation statics and normal moveout and then estimating and correcting for source-receiver statics. To apply the proper amount of source-receiver statics corrections, it is necessary to first determine the source-receiver statics $S_i + R_j$ associated with the source and receiver pair used to generate a trace and then apply this as a time shift to the trace.

The statics $S_i$ and $R_j$ can be estimated by determining or estimating the distance in feet between each of the source $S_i$ and receiver $R_j$ pairs to a datum plane and then dividing this distance by a wave propogation velocity value through the near surface layer $l_1$, i.e., $t = l_1/v$. This would provide some measure of the time offset introduced into a seismic trace by the source and receiver statics. However, it is difficult to precisely determine a velocity value for a particular source or receiver location, since different subsurface formation characteristics have different velocity characteristics and the datum may be located in a region where several formation layers are present between it and the surface, each having its own velocity characteristic. Moreover, if the distance of the source and receiver to the datum is estimated, this introduces additional errors in the source-receiver statics estimations, which are applied as time shift corrections to the individual seismic traces.

Various techniques have been developed for processing the seismic reflection signal traces to determine and correct for source and receiver statics to permit proper CDP trace stacking. Several such techniques are described in the following articles. "Automated Statics Corrections" by Hileman, et al, Geophysical Prospecting, Vol. XVI, pp. 326-358; "Estimation and Correction of Near-Surface Time Anomalies" by Taner, et al, Geophysics, Vol. 39, No. 4 (Aug. 19, 1974), pp. 441-463; "Residual Statics Analysis As A General Linear Inverse Problem", by Wiggins, et al, Geophysics, Vol. 41, No. 5 (October 1976), pp. 922-938.

Many techniques for correcting statics employ the cross-correlation of one trace of a gather, selected as a reference, with the remaining traces to determine the relative time shift between remaining traces and reference trace. The determined time shifts are then applied to the remaining traces to align them in time with the reference trace for stacking. In some techniques, reflection signal time of arrival data is derived and used to determine and apply the statics necessary for proper time alignment of the traces. While several of the known techniques can provide good time alignment results under the right circumstances, it is also possible to obtain poor results and consequent improper trace alignment and subsequent trace stacking.

SUMMARY OF THE INVENTION

An object of the invention is the provision of an improved method for source-receiver statics estimations and trace correction which obtains an improved accuracy over that obtained with prior art techniques, particularly those employing analysis of reflection data. In the method of the invention, both reflection and refraction data acquired from a common offset trace (COT) gather are employed to obtain precise source-receiver statics estimates, which are applied as time shifts to the reflection traces in the gather to permit proper CDP trace stacking. Reflection and refraction paths are determined for the gathered traces and source-receiving statics associated with the paths are determined from the paths using measured time of arrivals of reflection and refraction components in the signal traces of the COT gather.

The above and other objects, advantages and features of the method of the invention will become more readily apparent from the following detailed description of the invention, which is provided in connection with the accompanying drawings.

DETAILED DESCRIPTION OF THE INVENTION

To understand the invention, an understanding of both reflection and refraction signal paths taken by an acoustic signal through an earth formation is necessary. It is also important to understand that the source-receiver statics estimations performed in accordance with the invention are determined from a common offset trace (COT) gather, wherein no correction is required for normal moveout (NMO), as all source-receiver pairs used in generating the COT traces have the same spacing. It will also be assumed for the purpose of further discussion that elevation statics have been applied to the recorded and gathered traces using conventional techniques prior to the processing of the traces described hereinbelow.

Figure 1:
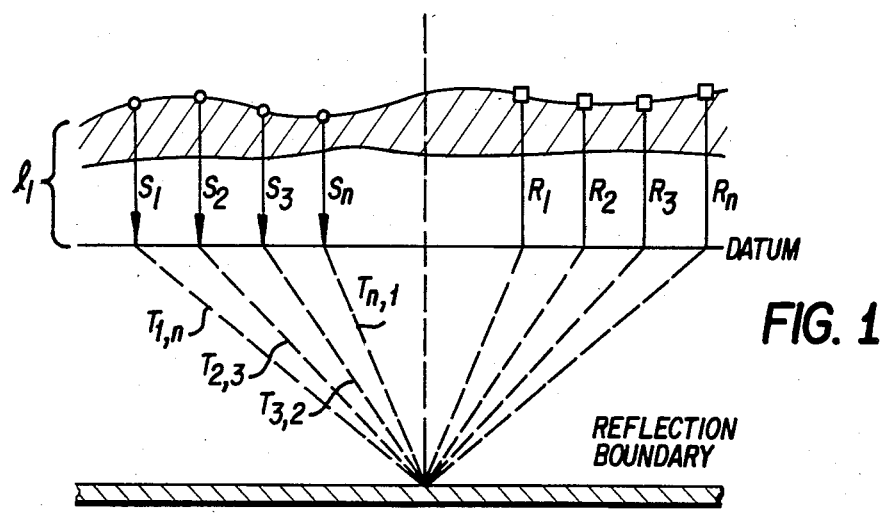
FIG. 1 is a representative view of an earth formation model showing a subsurface reflection boundary and multiple acoustic wave sources and receivers used to generate traces for a CDP gather.
Figure 2:
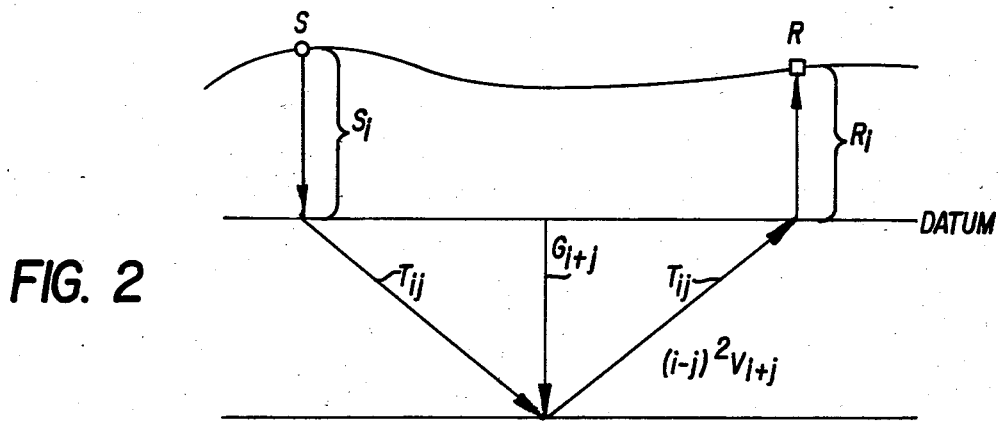
FIG. 2 is a view similar to that of FIG. 1, but showing a model of a reflection signal path.

FIG. 2 illustrates a reflection signal path model which exists between a source and receiver in a seismic exploration system. The total reflection signal travel time $T_{ij}$ between a particular source and a particular receiver pair can be expressed as $$T_{ij} = S_i + R_j + G_{i+j} + (i-j)^2 V_{i+j} \qquad (1)$$

where $S_i$ is the source static (acoustic wave travel time from a source $S_i$ to a datum), $R_j$ is the receiver static (acoustic wave travel time from a receiver $R_j$ to a datum), $G_{i+j}$ is the two-way travel time from the datum to the reflector and $V_{i+j}$ is the residual moveout component. The term $V_{i+j}$ represents a residual moveout component which remains after normal moveout correction (NMO) has been applied to the $T_{ij}$ reflection trace. Normal moveout (NMO) correction of seismic traces is well known in the art (see, for example, the Wiggins, et al and Taner, et al articles discussed above) and a detailed discussion of the techniques involved will not be repeated herein.

Figure 4A:
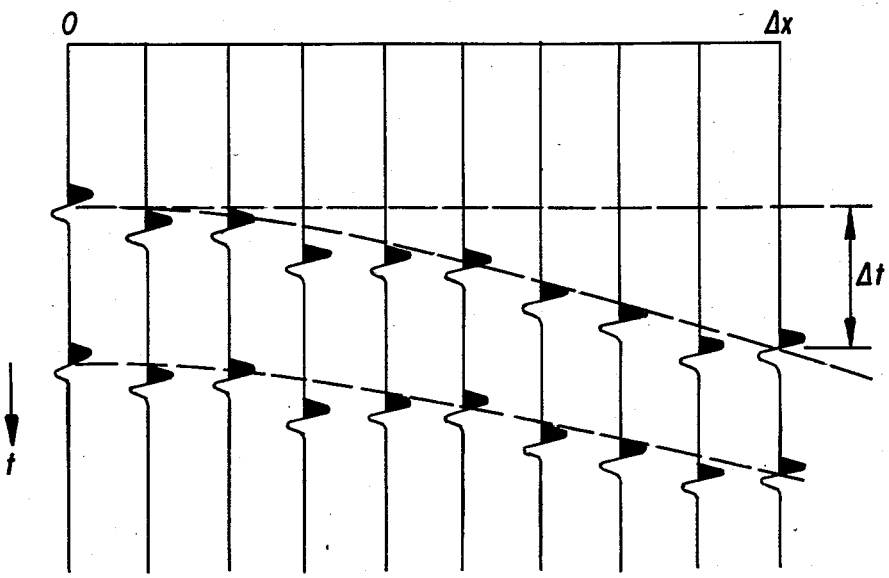
FIGS. 4a, 4b respectively represent a common depth point gather of traces uncorrected for normal moveout and corrected for normal moveout, the latter of which contains residual source-receiver statics which are corrected by the method of the invention.
Figure 4B:
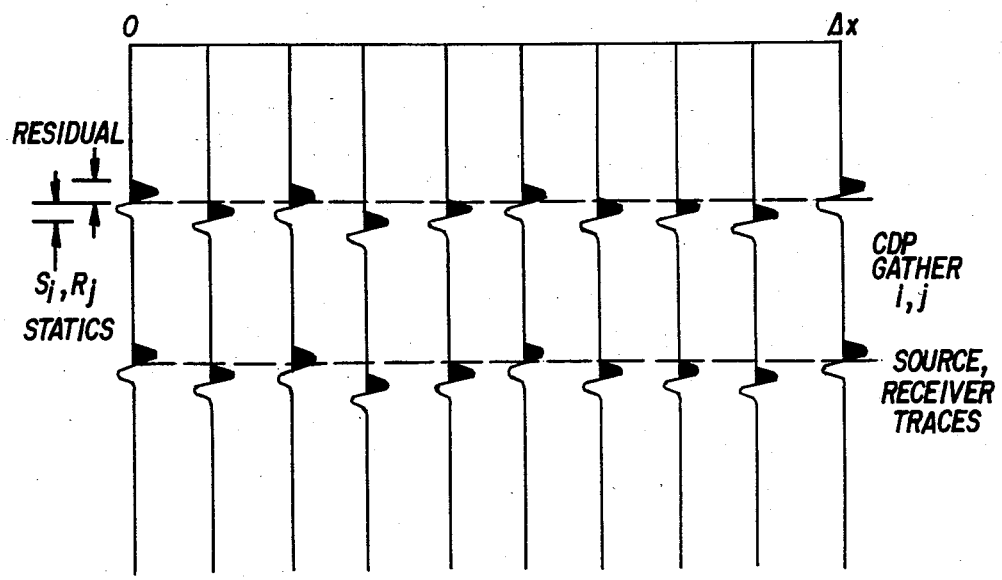

By way of background, the result of application of normal moveout correction to a gather of seismic traces is illustrated in FIGS. 4a, and 4b, where FIG. 4a illustrates the gather of traces before normal moveout correction and FIG. 4b illustrates the traces after this correction. FIG. 4b also illustrates the residual time differences between the NMO corrected trace signals which are to be estimated and corrected for using the invention prior to CDP stacking of the traces.

It should also be noted that the terms $S_i$, $R_j$ in Equation (1) may represent the entire source and receiver static to the datum, or they may represent residual source and receiver statics after a known source-receiver statics estimating and correcting technique is applied. It should also be noted that Equation (2) assumes surface consistency, i.e., all traces recorded at the same receiver location j will have the same receiver static and all traces recorded from the same source i will have the same source static, and that the statics are independent of frequency and are time invariant.

If common offset measurements are obtained using a COT trace gather, that is, by comparing traces having the same source-receiver separation, no NMO correction is required for statics analysis and the residual normal moveout component in Equation (1) disappears, enabling the following equation to be written:

$$T_{ij} - T_{i+1, j+1} = (S_i - S_{i+1}) + (R_j - R_{j+1}) + (G_{i+j} - G_{i+j+2}) \qquad (2)$$

or, in differential notation $$\Delta T_{ij} = \Delta S_i + \Delta R_j + \Delta G_{i+j} \qquad (3)$$

The total travel times $T_{ij}$ and $T_{i+1,j+1}$ taken in propogation of a reflection component of an acoustic wave from a source to a receiver are measured values obtained from the seismic traces themselves. Accordingly, the value $\Delta T_{ij}$ is likewise a measured value for particular source $S_i$ and receiver $R_j$ pairs. An iterative solution to Equation (3) can be written as follows:

$$\Delta G_{i+j}^{(n)} = \frac{1}{N_G} \sum_{i,j=1}^{m} (\Delta T_{ij} - \Delta S_i^{(n-1)} - \Delta R_j^{(n-1)}) \qquad (4)$$

$$\Delta S_i^{(n)} = \frac{1}{N_S} \sum_{i,j=1}^{m} (\Delta T_{ij} - \Delta R_j^{(n-1)} - \Delta G_{i+j}^{(n)}) \qquad (5)$$

$$\Delta R_j^{(n)} = \frac{1}{N_R} \sum_{i,j=1}^{m} (\Delta T_{ij} - \Delta S_i^{(n)} - \Delta G_{i+j}^{(n)}) \qquad (6)$$

where $N_G$ = the number of traces, $N_S$ = the number of sources and $N_R$ = the number of receivers; $S_i^{(o)} = R_j^{(o)} = G_{i+j}^{(o)} = 0$; m is the number of measurements taken; and n, the iteration index, = 1,2,3 ...

Simultaneous Equations (4), (5) and (6) can be solved using known techniques, e.g., the Gauss-Seidel method for solving simultaneous equations, to yield statics estimates for $\Delta S_i^{(n)}$ and $\Delta R_j^{(n)}$ from the measured values of the reflection signal $T_{ij}$ travel time, which could then be integrated and applied as time shifts to the respective traces $T_{ij}$ to correct the source-receiver statics and align in time the various traces, which can then be formed into a common depth point (CDP) gather. However, the invention further employs the conjuctive analysis and use of refraction and reflection component time of arrival data to improve the quality of the statics estimates and applied corrections.

Figure 3:
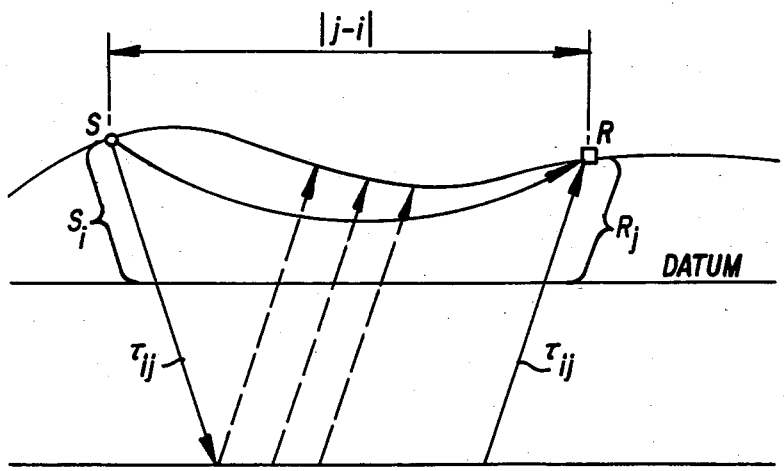
FIG. 3 is a view similar to that of FIG. 1, but showing a model of a refraction signal path.

FIG. 3 shows a refraction signal path model. The travel time for the refraction signal is:

$$T_{ij} = S_i + R_j + |j-i|/v \qquad (7)$$

where $T_{ij}$ is the travel time of the refraction wave arrival from the ith source to the jth receiver, $S_i$ and $R_j$ are the respective statics components, and $|j-i|/v$ is a linear term representing the spacing of the ith source and jth receiver. Common offset measurements can again be obtained from a COT gather of recorded traces by cross-correlating traces with the same source-to-receiver spacing to produce:

$$T_{ij} - T_{i+1, j+1} = (S_i - S_{i+1}) + (R_j - R_{j+1}) \qquad (8)$$

or, using difference notation $$\Delta T_{ij} = \Delta S_i + \Delta R_j \qquad (9)$$

Again, the source-to-receiver time of the refraction wave component $T_{ij}$ and $T_{i+1,j+1}$ of the gather traces are measured values, as is the difference value $\Delta T_{ij}$. An iterative solution to Equation (9) can be written as:

$$\Delta S_i^{(n)} = \frac{1}{N_S} \sum_{j=1}^{m} (\Delta T_{ij} - \Delta R_j^{(n-1)}) \qquad (10)$$

$$\Delta R_j^{(n)} = \frac{1}{N_R} \sum_{ij=1}^{m} (\Delta T_{ij} - \Delta S_i^{(n)}) \quad (11)$$

where $N_S$=the number of sources, $N_R$=the number of receivers; $S_i^{(o)} = R_j^{(o)} = 0$; m=number of measurements taken; and n, the iteration index,=1,2,3 ...

By combining the time measurements of the time of arrival of the reflection $T_{ij}$ and refraction $T_{ij}$ components in the recorded traces and, more specifically, the common offset measurements $\Delta T_{ij}$ and $\Delta T_{ij}$, a coupled set of non-linear equations can be written and solved to produce statics estimates for $S_i$ and $R_j$, which are better than those obtained using either reflection or refraction statics analysis techniques alone.

These equations can be represented as:

$$\Delta T_{ij} = \Delta S_i + \Delta R_j + \Delta G_{i+j} \quad (12)$$

$$L_{i+j}[\Delta T_{ij}] = \Delta S_i + \Delta R_j \quad (13)$$

and the iterative solution to Equations (12) and (13) by the following equations:

$$\Delta G_{i+j}^{(n)} = \frac{1}{N_G} \sum_{ij=1}^{m} (\Delta T_{ij} - \Delta S_i^{(n-1)} - \Delta R_j^{(n-1)}) \quad (4)$$

$$\Delta S_i^{(n)} = \frac{1}{N_S} \sum_{j=1}^{m} (\Delta T_{ij} - \Delta R_j^{(n-1)} - \Delta G_{i+j}^{(n)}) \quad (5)$$

$$\Delta S_i^{(n)} = \frac{1}{N_S} \sum_{j=1}^{m} (L_{i+j}[\Delta T_{ij}] - \Delta R_j^{(n-1)}) \quad (14)$$

$$\Delta R_j^{(n)} = \frac{1}{N_R} \sum_{i=1}^{m} (\Delta T_{ij} - \Delta S_i^{(n)} - \Delta G_{i+j}^{(n)}) \quad (6)$$

$$\Delta R_j^{(n)} = \frac{1}{N_R} \sum_{i=1}^{m} (L_{i+j}[\Delta T_{ij}] - \Delta S_i^{(n)}) \quad (15)$$

Figure 5:
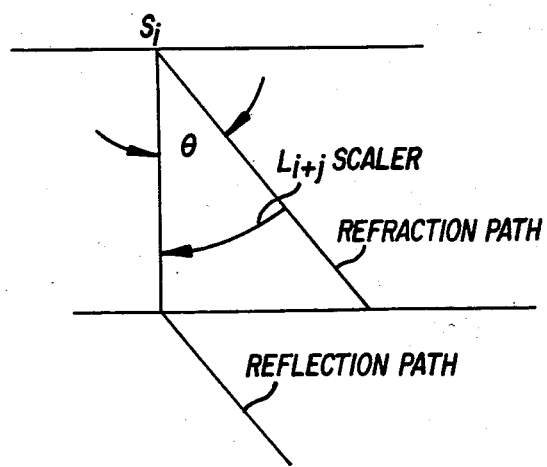
FIG. 5 illustrates a scaler correction employed in the method of the invention.

$L_{i+j}$=the value of $L_{i+j}$, which minimizes:

$$\phi^{(n)} = \sum_{i,j=1}^{m} (L_{i+j}^{(n)} \Delta T_{ij} - \Delta S_i^{(n)} - \Delta R_j^{(n)})^2 \quad (16)$$

over $L_{min} \leq L_{i+j} \leq L_{max}$, where $L_{min}$ and $L_{max}$ are predetermined selected boundary values, where $\Delta S_i$, $\Delta R_j$, and $\Delta G_{i+j}$ are the unknowns and $L_{i+j}$ is a scaler factor which normalizes the refraction signal path to the reflection signal path to correct for slant paths (angular displacements) between the two, as representatively shown in FIG. 5.

Coupled non-linear Equations (4), (5), (6), (14), (15) and (16) can be solved using known iteration techniques, such as a modified Gauss Seidel method for solving simultaneous equations to yield statics estimates for $\Delta S_i$, $\Delta R_j$, which are then integrated and applied as time shifts to the individual traces of a gather, e.g., a common depth point gather, for time alignment and subsequent stacking.

Figure 6:
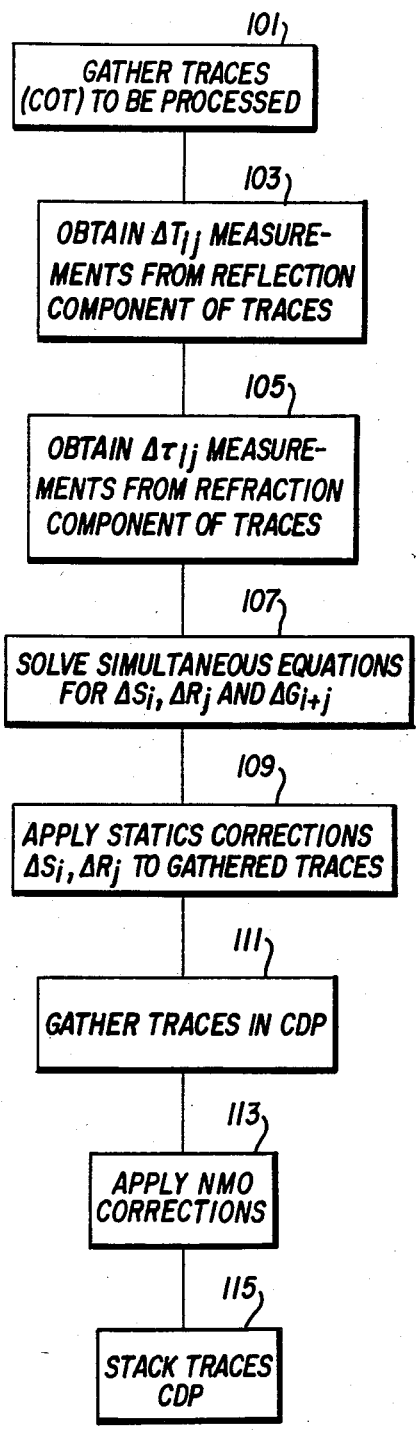
FIG. 6 is a flow chart representation of the processing steps of the invention.

FIG. 6 is a representative flow chart of the operations employed in the method of the invention, which could be implemented, for example, using a digital computer. In Step 101, the common offset traces (COT) produced by various source/receiver pairs are gathered from an array of recorded traces. In Step 103, the reflection measurements $\Delta T_{ij}$ are performed on the COT traces, using cross-correlation techniques as described above, while in Step 105, the refraction measurements $\Delta T_{ij}$ are likewise performed using cross-correlation techniques.

Then, in Step 107, the simultaneous equations listed above as ((4), (5), (6), (14) and (15)) are solved, using, for example, the modified Gauss-Seidel method for solving simultaneous equations to yield statics estimations for $\Delta S_i$, and $\Delta R_j$. Following this, in Step 109, the statics corrections are applied to the gathered traces, i.e., the traces are each time shifted by an amount corresponding to a determined source and receiver static, after which the now-corrected traces are CDP gathered in Step 111. In Step 113, conventional normal moveout corrections (NMO) are applied to the CDP gathered traces to remove the offset effects, and in Step 115, the CDP gathered traces are stacked. After this, the stacked traces can be used in conventional manner to produce seismograms representing subsurface formation characteristics.

By employing both reflection and refraction measurements, the method of the invention obtains an improved accuracy in statics estimates over that which can be obtained using reflection or refraction measurements alone. In addition, the use of a COT trace gather in the estimates problems of properly correcting gathered CDP traces for normal moveout, prior to computing and applying the statics.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

I claim:

1. A method for determining surface consistent statics associated with recorded seismic trace signals comprising the steps of:
   (a) generating acoustic waves into a geological formation from a plurality of acoustic wave sources;
   (b) recording arriving representations of acoustic waves generated from said sources at a plurality of spaced receiver locations;
   (c) forming a common offset trace (COT) gather of recorded acoustic waves;
   (d) measuring the differences in arrival times of reflection signal components in said COT gathered traces;
   (e) normalizing the paths taken by the refraction signal components to the paths taken by the reflection signal components to correct for slant paths (angular displacements) between said refractions and reflection signal components;
   (f) measuring the differences in arrival times of the normalized refraction signal components in said COT gathered traces;
   (g) determining said source and receiver statics for said COT gathered traces; and
   (h) aligning said gathered traces in time by shifting each said COT gathered trace by an amount corresponding to a determined source and receiver static associated therewith; and
   (i) determining the two way travel time from a datum to a reflection boundary.

2. A method as in claim 1, wherein a set of coupled non-linear equations representing said measured differences in arrival times of said reflection signal components and said refraction signal components is solved to determine said source and receiver statics as follows:

$$\Delta T_{ij} = \Delta S_i + \Delta R_j + \Delta G_{i+j}, \text{ and}$$

$$L_{i+j}[\Delta T_{ij}] = \Delta S_i + \Delta R_j,$$

where:

$L_{i+j}=$ the value of $L_{i+j}$, which minimizes the expression:

$$\sum_{i,j=1}^{m} (L_{i+j}^{(n)} \Delta T_{ij} - \Delta S_i^{(n)} - \Delta R_j^{(n)})^2$$

over $L_{min} \leq L_{i+j} \leq L_{max}$, where $L_{min}$ and $L_{max}$ are predetermined selected boundary values, and $L_{i+j}$ is a scaler factor which normalizes the refraction signal path to the reflection signal path to correct for slant paths (angular displacements) between the two, and where $\Delta T=$ the difference in arrival times,
$\Delta S=$ the change in source static time,
$\Delta R=$ the change in receiver static time,
$\Delta G=$ the two way travel time from the datum to the reflection boundary,
$m=$ the number of measurements taken,
$n=$ the iteration index 1, 2, 3 . . .

* * * * *